Dec. 26, 1922.
W. RUNGE ET AL.
RECOVERY OF PHENOL VAPORS BY TAR OILS.
FILED AUG. 27, 1921.
1,440,108.
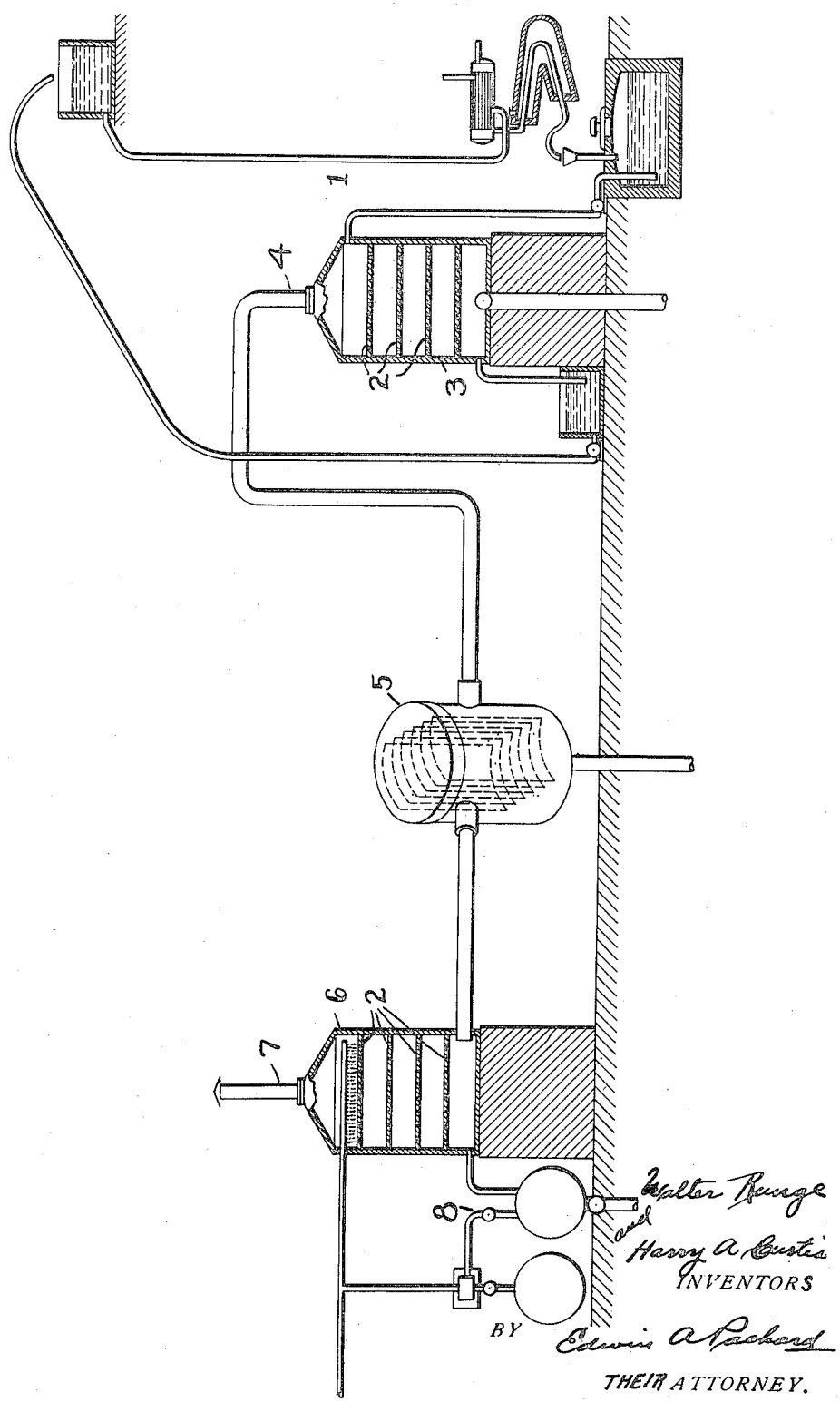

Patented Dec. 26, 1922.

1,440,108

UNITED STATES PATENT OFFICE.

WALTER RUNGE, OF ORANGE, AND HARRY A. CURTIS, OF MAPLEWOOD, NEW JERSEY, ASSIGNORS TO BREGEAT CORPORATION OF AMERICA, OF WILMINGTON, DELAWARE, A CORPORATION OF DELAWARE.

RECOVERY OF PHENOL VAPORS BY TAR OILS.

Application filed August 27, 1921. Serial No. 495,970.

*To all whom it may concern:*

Be it known that we, WALTER RUNGE and HARRY A. CURTIS, citizens of the United States, and residents, respectively, of Orange and Maplewood, in the county of Essex and State of New Jersey, have jointly invented certain new and useful Improvements in the Recovery of Phenol Vapors by Tar Oils, of which the following is a specification.

In United States Letters Patent No. 1,315,700 and No. 1,315,701 dated September 9, 1919, there is described, respectively, a process and an apparatus for the recovery of volatile solvents, relating to inventions of Jean Henry Bregeat and according to which phenols pure or mixed with any other products or reagents, are employed for the recovery of volatile solvents.

If the Bregeat process described in said patents is properly performed, practically all of each volatile solvent can be recovered. There is some loss, although comparatively small, of the absorbent used for the recovery of the volatile solvents from the air or other gaseous medium, due largely to some of the cresol passing off in a state of vapor or otherwise from the air exit of the Bregeat system.

The present invention is particularly concerned with the employment of a suitable tar oil for the recovery or collecting of cresol vapors.

The gaseous medium with cresol vapors entrained therein constitutes a new gaseous mixture and according to the present invention this mixture is brought into intimate contact with a tar oil, and especially with dead oil in a manner that such oil absorbs the cresol vapors from the gaseous mixture. The term "dead oil" is to be construed as comprehending, by way of example, tar oils such as are derived from a coal tar fraction or from an oil tar fraction and said dead oil may or may not have a tar acid content. A neutral dead oil, to wit, a tar oil free of tar acids, is the tar oil preferably employed in the present invention. Reference is made to the accompanying drawing in which the figure is a sectional elevation of the essential parts of a suitable apparatus.

1 designates a portion of the Bregeat system. The Bregeat system comprises an absorption column 3 with trays 2 which function the same as in the prior patents cited. The gaseous medium (e. g. air) after treatment by the crude cresol or other phenol, for the removal of the volatile solvent vapors, leaves the absorption column at 4, as indicated in the patents mentioned. The gaseous medium leaving the absorption column has entrained or mixed therewith cresol, (partly in vapor form) resulting from the counter travel of the gaseous medium and the cresol or other phenol used as the absorbent. The gaseous medium leaving the absorption column from the top as at 4 then preferably passes to a device 5 referred to herein as a mechanical cresol separator, the function of which is to eliminate the droplets or mist of cresol from the gaseous medium whereby there will remain in the gaseous medium substantially only that cresol which is in the form of vapor. From the cresol separator 5 the gaseous medium with cresol vapors remaining therein is passed to a second or auxiliary absorption column 6 which contains a tar oil as absorbent for cresols. This tar oil initially has no (or a very small) tar acid content, i. e., a neutral dead oil. The dead oil effects a removal or lapping up or absorption of the cresol vapors, substantially completely. Finally, the gaseous medium substantially freed of cresol vapors leaves at 7. A circulating system as 8 may effect a continuous supply of the absorbent, (dead oil) to the top of absorber 6.

In regard to the quantity of cresol vapors in the gaseous medium, this may amount to approximately 0.7 grams of cresol at 20 degrees C. Also some cresol may be mechanically taken over as droplets, with the gaseous mixture leaving the absorption column 3. The liquid droplets of the cresol can be precipitated by the mechanical cresol separator as 5. This separator, will not eliminate the cresol vapor, from the gaseous medium. The gaseous mixture comprising the air and cresol vapor is passed through the cresol separator 6. To be on the safe side as to an estimate, it is customary to allow for 0.8 grams of cresol per cubic meter of gaseous mixture, and as previously indicated the present invention is concerned with the recovery of the 0.8 grams of cresol per cubic meter of outgoing gaseous medium.

Of course, in place of the particular absorption column 6, any other absorption device might be used whereby the dead oil is brought into intimate contact with the gaseous mixture.

This process can be continued or repeated until the dead oil becomes saturated or has absorbed the desired amount of cresol, whereupon the dead oil may be treated to recover the cresol therefrom; or the dead oil and cresol mixture sold or used for making a disinfectant or other product.

Dead oil is a well known material. Dead oil from coal tar consists of all oil, or any oil, distilled from coal tar between temperatures of 170° C., and 300° C. A neutral dead oil derived from coal tar is a dead oil from which the tar acids, that is phenol, cresols, xylenols, etc., have been removed, as by repeated washing with caustic solution and water. The distillation range for such neutral dead oil varies but may usually be stated to range from 170° C., to 300° C. Its specific gravity varies from 0.95 in the lighter fraction to 1.12 in the heavier. Dead oil from oil tar consists of all oils, or any oil, distilled from water-gas tar, or other oil tars, between the temperatures of 170° C., and 320° C., and from which the naphthalene may or may not have been removed. Its specific gravity at 60° F., varies from 1.00 to 1.04. The term "dead oil" is also sometimes used in the literature in reference to the fraction of coal tar oils between 200° C., and 270° C., from which the tar acids have been removed, but for the purposes of this case the broader definition applies.

The dead oil—neutral dead oil—may be considered as any oil obtained from coal tar by distillation carried out anywhere between the temperature ranges herein specified, or any oil fraction obtained from distillation carried out anywhere or somewhere between said limits.

The several cresols have boiling points between 190° C., and 202° C. Phenol has a boiling point of 182.6° C., while the several xylenols have boiling points between 211.5° C., and 219.5° C., as expressed by several authorities.

It will be noted that any absorbent herein indicated, to wit, that broadly termed dead oil, which may or may not have tar acids therein, and that less broadly referred to as neutral dead oil, are suitable for the absorbing of the vapors of cresol, phenol, etc. It will furthermore be remarked that each such dead oil which functions as an absorbent is a product of distillation, the distillation ranges of which generally extend from below to above the boiling temperatures of the vapors of the liquids to be absorbed thereby.

Accordingly the present invention comprehends the employment of oils distilled from tar between, or anywhere or somewhere between, the temperatures of 170° C., and 320° C., and preferably free from tar acid. For example, the oils may have no tar acid content at the end of the tar distillation, or they may be tar oils from which the tar acids have been removed. Any tar fraction which satisfies this requirement is to be considered as coming within the broader aspect of the present invention.

It will therefore be manifest that the invention may be carried out in various ways without departing from the spirit and scope thereof.

What we claim is:

1. A process for the recovery of volatile solvent vapors from a gaseous medium by cresol as an absorbing agent, characterized by subjecting the gaseous medium to tar oil treatment, after vapors of volatile solvents have been removed by the cresol, which gaseous medium carries vapors of the absorbing agent, said tar oil treatment being carried out in a manner whereby the cresol vapors may be absorbed by the tar oil, said tar oil initially being substantially free from tar acid, said tar oil being a fraction from a tar distillation effected somewhere between approximately 170° C., and 320° C.

2. In the recovery of volatile solvents wherein a phenol is employed as absorbing medium for vapors of the volatile solvents from a gaseous medium, a method which comprises subjecting the gaseous medium, after vapors of the volatile solvents have been removed by the phenol, but which gaseous medium carries vapors of the phenol, to tar oil for absorption of said phenol, which tar oil is initially substantially free from tar acids, and which tar oil is a fraction from a tar distillation effected between approximately 170° C., and 320° C.

3. In the recovery of phenol mixed with gaseous medium, the step of bringing an oily tar fraction into intimate contact with said mixture, which oil is initially substantially devoid of tar acid content, and continuing the contact of such mixture with the oil until the oil has absorbed the desired amount of phenol.

4. In the recovery of volatile solvent vapors by a phenol, the method which comprises subjecting a gaseous medium carrying volatile solvent vapors, to the absorbing action of a phenol, and subsequently subjecting the gaseous medium to dead oil of tar, to effect the removal of the phenol therefrom.

5. In the recovery of cresol vapors from a gaseous medium, the step of intimately contacting a mixture comprising a gaseous medium and the cresol vapors with an oily tar fraction distilling somewhere between approximately 170° C., and 320° C., and which tar fraction is initially substantially devoid of tar acid content, and continuing contacting such mixture with the tar fraction until it has absorbed the desired cresol content.

6. In the recovery of the vapors of volatile solvents by crude cresol, the method which comprises subjecting a gaseous medium from which the volatile solvents have been removed by the crude cresol to a subsequent cresol absorption treatment with neutral dead oil.

7. A process for the recovery of volatile solvent vapors from a gaseous medium by cresol as an absorbing agent, characterized by subjecting the gaseous medium to intimate contact with dead oil after vapors of the volatile solvent have been removed by the cresol absorbing agent but which gaseous medium carries vapors of the absorbing agent, said dead oil treatment being carried out in a manner whereby the cresol vapors may be absorbed by the dead oil, said dead oil having initially substantially no tar acid content, said dead oil being a fraction from a tar distillation carried out somewhere between approximately 170° C., and 320° C.

8. In the recovery of volatile solvents wherein a phenol is employed as a medium for absorbing of vapors of the volatile solvents from gaseous medium, a method which comprises removing said volatile solvents from said gaseous medium by treatment with a phenol, and then contacting the gaseous medium carrying phenol vapors, with dead oil for absorbing the phenol vapors, which dead oil has initially no appreciable tar acid content, and which dead oil is a fraction from a tar distillation effected anywhere between approximately 170° C., and 320° C.

9. In the recovery of phenol mixed with a gaseous medium, the bringing of neutral dead oil into intimate contact with a gaseous mixture, carrying said phenol, which neutral dead oil is initially substantially devoid of tar acid content, and continuing to contact such mixture with the oil until the oil has taken on the desired phenol content.

Specification signed this 16th day of Aug., A. D., 1921, and this 23rd day of Aug., A. D., 1921.

WALTER RUNGE. [L. S.]
HARRY A. CURTIS. [L. S.]